US008131624B1

(12) United States Patent
Willens et al.

(10) Patent No.: US 8,131,624 B1
(45) Date of Patent: Mar. 6, 2012

(54) METHOD, SOFTWARE PROGRAM, AND SYSTEM FOR OFFERING DEBT

(75) Inventors: Kevin Willens, Short Hills, NJ (US); Arthur Miller, New York, NY (US); Josh Wilkes, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1272 days.

(21) Appl. No.: 10/135,306

(22) Filed: Apr. 30, 2002

Related U.S. Application Data

(60) Provisional application No. 60/288,408, filed on May 3, 2001.

(51) Int. Cl.
*G06Q 40/00* (2006.01)
(52) U.S. Cl. ............................................. 705/37; 705/35
(58) Field of Classification Search .................... 705/35, 705/36 R, 37, 38, 39
See application file for complete search history.

(56) References Cited

U.S. PATENT DOCUMENTS 5,915,209 A * 6/1999 Lawrence ...................... 340/3.7
(Continued)

*Primary Examiner* — Jagdish Patel
*Assistant Examiner* — Kenneth Bartley
(74) *Attorney, Agent, or Firm* — Chadbourne and Parke LLP; John A. Squires

(57) ABSTRACT

The present invention relates to a method, software program, and system for offering debt. More particularly, in one embodiment a method for offering a predetermined amount of debt is provided, comprising: dividing the debt into a plurality of debt elements, wherein each of the debt elements has associated therewith at least one of a maturity amount, a maturity date, and a yield; and periodically offering at least one of the debt elements for sale into a primary market; wherein at least one of the maturity amount, the maturity date, and the yield associated with each of the debt elements is based on a demand for the debt element at the time that the debt element is offered.

11 Claims, No Drawings

U.S. PATENT DOCUMENTS

| | | | | |
|---|---|---|---|---|
| 6,161,099 | A * | 12/2000 | Harrington et al. | 705/36 R |
| H2064 | H * | 5/2003 | Buchalter | 705/37 |
| 6,778,968 | B1 * | 8/2004 | Gulati | 705/36 R |
| 7,266,520 | B1 * | 9/2007 | Herbst et al. | 705/35 |
| 7,526,443 | B2 * | 4/2009 | Agarwal et al. | 705/35 |
| 7,590,585 | B2 * | 9/2009 | Agarwal et al. | 705/37 |
| 2001/0044771 | A1 * | 11/2001 | Usher et al. | 705/37 |
| 2001/0051932 | A1 * | 12/2001 | Srinivasan et al. | 705/400 |
| 2002/0019795 | A1 * | 2/2002 | Madoff et al. | 705/37 |
| 2002/0052816 | A1 * | 5/2002 | Clenaghan et al. | 705/36 |
| 2002/0052824 | A1 * | 5/2002 | Mahanti et al. | 705/37 |
| 2002/0055897 | A1 * | 5/2002 | Shidler et al. | 705/35 |
| 2002/0095369 | A1 * | 7/2002 | Kaplan et al. | 705/37 |
| 2002/0111896 | A1 * | 8/2002 | Ben-Levy et al. | 705/37 |
| 2002/0156719 | A1 * | 10/2002 | Finebaum et al. | 705/37 |
| 2004/0230512 | A1 * | 11/2004 | Gulati | 705/36 |

* cited by examiner

METHOD, SOFTWARE PROGRAM, AND SYSTEM FOR OFFERING DEBT

CROSS-REFERENCE TO RELATED APPLICATIONS

This application claims the benefit under 35 U.S.C. 119(e) of U.S. Provisional application Ser. No. 60/288,408, filed May 3, 2001.

FIELD OF THE INVENTION

The present invention relates to a method, software program, and system for offering debt. More particularly, in one embodiment a method for offering a predetermined amount of debt is provided, comprising: dividing the debt into a plurality of debt elements, wherein each of the debt elements has associated therewith at least one of a maturity amount, a maturity date, and a yield; and periodically offering at least one of the debt elements for sale into a primary market; wherein at least one of the maturity amount, the maturity date, and the yield associated with one of the debt elements is based on a demand for the debt element at the time that the debt element is offered.

BACKGROUND OF THE INVENTION

Traditionally, large issuers of debt sell such debt (in the form of tax-exempt bonds, for example) relatively infrequently in single large issuances. For example, for its new money needs the State of California has traditionally issued approximately $500 million to $1 billion of general obligation debt (e.g., bonds) each quarter. These quarterly sale dates do not typically correspond to the demand for the bonds, which demand tends to be in smaller amounts on a daily basis and more evenly spread out. This is particularly true with regard to demand from retail investors.

To correct this supply/demand imbalance, other parties such as registered broker-dealers ("BD's") and institutional investors traditionally tend to warehouse bonds upon issuance and distribute the bonds more widely over time in what is called the secondary market (i.e., a market into which bonds are sold post-issuance by the bond issuer). Such a secondary market trading may be carried out on trading platforms such as "BondDesk" or "BondBook". Sales in the secondary market do not directly benefit the bond issuer, however.

Bonds sold in the primary market (e.g. the initial market into which the bonds are sold upon issuance by the bond issuer) are either sold via a negotiated sale (whereby a dealer negotiates with the issuer as to the interest rates) or competitive sale (whereby dealers bid a price to purchase the bonds and the highest price wins). In either case, orders are solicited by dealers from investors and bonds, and are sold at a single point in time (i.e. date of pricing). It is quite common for some maturities in a bond issue either to be oversubscribed (more orders than bonds offered, implying the yield might be too high) or undersubscribed (indicating the opposite). Therefore, issuers do not always receive the exact yield for their debt that matches demand.

DETAILED DESCRIPTION OF THE INVENTION

As required, detailed embodiments of the present invention are disclosed herein; however, it is to be understood that the disclosed embodiments are merely illustrative of the invention that may be embodied in various forms. In addition, each of the examples given with reference to the present invention are intended to be illustrative and not restrictive. Therefore, specific structural and functional details disclosed herein are not to be interpreted as limiting, but merely as a basis for the claims and as a representative basis for teaching one skilled in the art to variously employ the present invention.

In one embodiment a method for offering a predetermined amount of debt is provided, comprising: dividing the debt into a plurality of debt elements, wherein each of the debt elements has associated therewith at least one of a maturity amount, a maturity date, and a yield; and periodically offering at least one of the debt elements for sale into a primary market; wherein at least one of the maturity amount, the maturity date, and the yield associated with each of the debt elements is based on a demand for the debt element at the time that the debt element is offered.

In one example each of the debt elements may comprise a bond.

In another example at least one of the maturity amount, the maturity date, and the yield associated with a first one of the bonds may differ, from one periodic offering to another, from a respective maturity amount, maturity date, and yield associated with a second one of the bonds.

In another example at least one of the maturity amount, the maturity date, and the yield associated with one of the bonds may be based on a value computed as: (a) the predetermined amount of debt minus (b) the value of the bonds which have been periodically offered.

In another example each of the bonds may be issued by an issuer and at least one of the maturity amount, the maturity date, and the yield associated with one of the bonds may be based on at least one of: (a) a legal constraint imposed upon the issuer; (b) a debt service objective of the issuer; (c) a cash flow requirement of the issuer; and (d) a previous bond sales experience by the issuer.

In another example the yield of at least one of the bonds may be set as a spread to a predetermined benchmark index.

In another example the yield of at least one of the bonds may be set as an absolute value.

In another example the periodic offering may occur at one of (a) a recurring frequency selected from the group including: a frequency greater than once per second; a frequency of once per second; a frequency between once per second and once per minute; a frequency of once per minute; a frequency between once per minute and once per hour; a frequency of once per hour; a frequency between once per hour and once per day; a frequency of once per day; a frequency between once per day and once per week; a frequency of once per week; a frequency between once per week and once per month; and a frequency of once per month; and (b) a non-recurring frequency.

In another example at least one of the maturity date, the maturity amount, and the yield associated with at least one of the bonds may be published.

In another example the publication may be carried out via a website.

In another example the website may be accessible through at least one of the Internet, an intranet, a wide-area network, and a local-area network.

In another embodiment a method for offering a predetermined amount of debt in the form of a plurality of bonds is provided, comprising: periodically issuing at least one of the bonds, wherein each of the issued bonds has associated therewith at least one of a maturity amount, a maturity date, and a yield; and periodically offering at least one of the issued bonds for sale into a primary market; wherein at least one of the maturity amount, the maturity date, and the yield associated with each of the bonds is based on a demand for the bond at the time that the bond is offered.

In one example at least one of the maturity amount, the maturity date, and the yield associated with a first one of the issued bonds may differ, from one periodic offering to another, from a respective maturity amount, maturity date, and yield associated with a second one of the issued bonds.

In another example at least one of the maturity amount, the maturity date, and the yield associated with one of the bonds may be based on a value computed as: (a) the predetermined amount of debt minus (b) the value of the bonds which have been periodically offered.

In another example each of the bonds may be issued by an issuer and at least one of the maturity amount, the maturity date, and the yield associated with one of the bonds may be based on at least one of (a) a legal constraint imposed upon the issuer; (b) a debt service objective of the issuer; (c) a cash flow requirement of the issuer; and (d) a previous bond sales experience by the issuer.

In another example the yield of at least one of the issued bonds may be set as a spread to a predetermined benchmark index.

In another example the yield of at least one of the issued bonds may be set as an absolute value.

In another example each of the periodic issuing and the periodic offering may occur at one of: (a) a recurring frequency selected from the group including: a frequency greater than once per second; a frequency of once per second; a frequency between once per second and once per minute; a frequency of once per minute; a frequency between once per minute and once per hour; a frequency of once per hour; a frequency between once per hour and once per day; a frequency of once per day; a frequency between once per day and once per week; a frequency of once per week; a frequency between once per week and once per month; and a frequency of once per month; and (b) a non-recurring frequency In another example each of the periodic issuing and the periodic offering may occur at substantially the same time.

In another example at least one of the maturity date, the maturity amount, and the yield associated with at least one of the issued bonds may be published.

In another example the publication may be carried out via a website.

In another example the website may be accessible through at least one of the Internet, an intranet, a wide-area network, and a local-area network.

In another embodiment a method for offering a predetermined amount of debt in the form of a plurality of bonds, wherein each of the bonds has associated therewith at least one of a maturity amount, a maturity date, and a yield is provided, comprising: periodically issuing at least one of the bonds; and periodically offering at least one of the issued bonds for sale into a primary market; wherein at least one of the maturity amount, the maturity date, and the yield associated with each of the bonds is based on a demand for the bond at the time that the bond is offered; and wherein one of the maturity amount, the maturity date, and the yield associated with a first one of the issued bonds differs, from one periodic offering to another, from a respective maturity amount, maturity date, and yield associated with a second one of the issued bonds.

In another example at least one of the maturity amount, the maturity date, and the yield associated with one of the bonds may be based on a value computed as: (a) the predetermined amount of debt minus (b) the value of the bonds which have been periodically offered.

In another example each of the bonds may be issued by an issuer and at least one of the maturity amount, the maturity date, and the yield associated with one of the bonds may be based on at least one of: (a) a legal constraint imposed upon the issuer; (b) a debt service objective of the issuer; (c) a cash flow requirement of the issuer; and (d) a previous bond sales experience by the issuer.

In another example the yield of at least one of the issued bonds may be set as a spread to a predetermined benchmark index.

In another example the yield of at least one of the issued bonds may be set as an absolute value.

In another example each of the periodic issuing and the periodic offering may occur at one of (a) a recurring frequency selected from the group including: a frequency greater than once per second; a frequency of once per second; a frequency between once per second and once per minute; a frequency of once per minute; a frequency between once per minute and once per hour; a frequency of once per hour; a frequency between once per hour and once per day; a frequency of once per day; a frequency between once per day and once per week; a frequency of once per week; a frequency between once per week and once per month; and a frequency of once per month; and (b) a non-recurring frequency.

In another example each of the periodic issuing and the periodic offering may occur at substantially the same time.

In summary, various embodiments of the present invention provide for what will hereinafter be referred to as the Continuous Offering Approach ("CO Approach"). Of note, the CO Approach may be embodied in a method, a software program, a system, or a combination thereof.

More particularly, one embodiment of the CO Approach according to the present invention may operate as follows. Rather than issuing a given amount of debt into the primary market in one large issuance (wherein the debt terms such as yield and maturity date are set for the entire amount of the debt on a single pricing date), a mechanism is provided for offering debt into the primary market a portion at a time in a "continuous" manner (e.g., periodically for any desired term at any desired periodic rate, such as instantaneously, hourly, daily, weekly, or monthly, for example).

By operating in this manner the present invention provides a mechanism for allowing the bond issuer to align supply and demand in an ongoing fashion. Further, the present invention should provide a less risky alternative (at least from the point of view of the bond issuer) to the traditional negotiated process or competitive process because the issuer may sell as much debt as is needed and desired at the lowest possible yield (thus creating the most benefit for the issuer).

In another embodiment of the CO Approach according to the present invention a mechanism is provided for dynamically modifying (during the "continuous" offering of debt) offered maturity amounts and/or maturity dates and/or bond yields and for providing real-time and/or non-real time executable offerings to the market (which may be the primary market, for example). The dynamically modified offered maturity amounts and/or maturity dates and/or bond yields may be based on an issuer's legal constraints and/or debt service objectives and/or cash flow needs and/or previous bond sales, for example.

More particularly, maturity amounts and/or maturity dates may be set by traditional algorithms used to set desired debt service patterns, or may be set manually. Bond yields may also be set manually, or may be set in relation to a certain index (e.g., the bond yield may be set at a spread to an index provided by an organization that produces such indexes (e.g., Municipal Market Data High Grade Scale, Municipal Market Advisors' Consensus Scale, or LIBOR). Bond yields may also be set using "a dynamic pricing engine" algorithm wherein as the debt is sold the yield is adjusted (e.g., increased or decreased) based upon how much debt there is left to offer (e.g., if the total debt to be offered was initially $500 million, the dynamic pricing engine may adjust the yield when there is $300 million left to be offered). Furthermore, a combination of these mechanisms may be used for setting amounts and/or dates and/or yields.

In another embodiment of the CO Approach according to the present invention, one or more of the bond issuer, the underwriter, and a financial advisor (either alone or in combination) may control and/or profit from the setting of the bond yield, which may be an absolute value and/or a spread to a desired index (e.g. above, below or equal).

In another embodiment of the CO Approach according to the present invention, a mechanism is provided for keeping a certain number of interest rates and/or CUSIP numbers open for each offered maturity amounts and/or maturity dates and/or bond yields. In one example of the present embodiment (which is intended to be illustrative only, and not restrictive) a certain number of bonds (e.g. up to $1,000,000) of a particular maturity may be offered with pre-determined interest rates in increments of a certain number of basis points (e.g. 25 basis points). For tax simplification reasons, bonds may be sold only at par or a premium above par. If market yields rise or fall substantially, one or more new bonds with different interest rates and/or CUSIP) 6 numbers may be made available.

In another embodiment of the CO Approach according to the present invention, a mechanism is provided for permitting a Continuous Offering Administrator to adjust and refresh offering yields on a real-time or non-real-time basis. Such adjustment and refreshing of offering yields may be carried out either manually (i.e. manually setting offering levels on behalf of the issuer) or automatically based on electronically available market data (such as the MMD high grade scale). A pricing engine may be incorporated which could adjust offering prices based upon the flow of orders received and a targeted level of daily bond sales, for example (e.g. supply and demand). Moreover, the Administrator could also adjust maturity amount and/or dates.

In another embodiment of the CO Approach according to the present invention, a mechanism is provided for permitting bonds to be offered to BD's associated with independent trading platforms, such as BondDesk or BondBook.

In another embodiment of the CO Approach according to the present invention a mechanism is provided for permitting the monitoring of bond sales on a real-time or non-real-time basis. Such monitoring may be carried out electronically by a Continuous Offering Administrator and/or a bond issuer, for example. Likewise, the Continuous Offering Administrator and/or the bond issuer may electronically adjust offering amounts and/or suspend the offering. In one example of the present embodiment (which is intended to be illustrative only, and not restrictive), an issuer could, through password-protected access to a web site, immediately suspend one or more offerings in order to provide revised disclosure to the market. The issuer monitoring function could also allow an issuer to review, for example, historical bond sales, relative trading levels, achieved debt service pattern, and/or net proceeds generated.

In another embodiment of the CO Approach according to the present invention, a mechanism is provided for communicating any necessary information to allow a bond trustee or registrar to settle all bond purchases through the Depository Trust Company ("DTC") or other book entry clearing system.

As known to those of ordinary skill in the art, bond purchases are settled through the DTC by sending an application to the DTC, closing through the DTC, and handling any additional requirements through the DTC.

In another embodiment of the CO Approach according to the present invention a mechanism is provided for communicating with Dalcomp to facilitate operational functions supporting each bond purchase. As known to those of ordinary skill in the art, Dalcomp is a computer system that underwriters use. More particularly, Dalcomp is a centralized system for syndicate communication and order entry in conjunction with primary market bond issues and is owned by Thomson Financial. In one example of the present embodiment (which is intended to be illustrative only, and not restrictive), Dalcomp may be provided information from the present invention on a periodic basis (e.g., hourly, daily, weekly, or monthly).

In another embodiment of the CO Approach according to the present invention, a mechanism is provided for the automatic creation and distribution of an Offering Document. More particularly, for example, to help keep disclosure documentation from becoming a burden, preliminary and final Official Statements could be divided into three parts: 1) the "Core" Official Statement could contain the audited financials, management discussion, general terms, etc. (this document could be produced once or twice a year); 2) a Term Sheet may be produced periodically (e.g. daily, hourly, weekly) containing the specific terms of the bonds sold for that time period; and 3) a "Bring-Down" section may disclose any material events (if any) that have occurred since the date of the Core Official Statement. All three documents could make clear that they must be read together, and the latter two could incorporate the Core Official Statement by reference. For example, the daily Term Sheet reflecting the bonds sold on that day may be automatically produced. The daily Term Sheet may also be electronically distributed (or otherwise made available) to the bond issuer, participating BD's and investors, for example. The Official Statement (e.g., Core Official Statement, "Bring-Down" sections and Term Sheets) may also be electronically distributed (or otherwise made available) to BD's and investors, for example. Depending on regulatory requirements, bonds may be offered only to BD's and investors that have consented to electronic Official Statement delivery. The Term Sheets may include information such as: bond maturity; bond yield; a first interest payment date; a dated date; bond rating; amount offered; name of bond series; tax status; and optional redemption.

In another embodiment of the CO Approach according to the present invention, a mechanism is provided for automatic regulatory and tax reporting. More particularly, the periodic (e.g. hourly, daily) Term Sheets may be electronically distributed to the Municipal Securities Rulemaking Board ("MSRB") and/or the Nationally Recognized Municipal Securities Information Repositories ("NRMSIRs") as required. For tax reporting purposes, Form 8038 (detailing debt issuance in the prior quarter) may be generated and filed automatically (e.g. quarterly). For tax purposes, use of proceeds may be for new money purposes that are discretely identifiable (e.g., all capital expenditures within the next six months). Issuance could be for governmental and charitable (501(c)(3)) purposes. A "blanket" use of proceeds certificate could be certified at the start of the program so as to comply with the Section 148 tax certificate requirements, for example.

In another embodiment of the CO Approach according to the present invention, a Continuous Offering Administrator may provide software and/or management services. More particularly, the Continuous Offering Administrator may provide the necessary services and tools to carry out the CO Approach. Internet-based software that may allow the bond issuer, bond counsel, trustee, registrar and Continuous Offering Administrator to manage the "continuous" offering may be used. The software may be accessible over the Internet via the Continuous Offering Administrator's web site. For example, access to the web site may be password-protected and secure, allowing user authentication; and/or different users may have different levels of access. For example, BD's may be able to view current live offerings, obtain information about the offerings, download a preliminary Official Statement, and purchase bonds while the Continuous Offering Administrator and bond issuer may be able to manage the offering (e.g., amount, structure and pricing) and view detailed and summary information of bonds sold.

In another embodiment of the CO Approach according to the present invention, the bond issuer may have the option of signing a Standby Purchase Agreement with the Continuous Offering Administrator to protect against a partially-completed debt program. This Standby Purchase Agreement could be renewed periodically (e.g., quarterly), for example, and could obligate the Continuous Offering Administrator to buy up to set amounts of bonds in specified years at predetermined spreads to an index such as the Municipal Market Data High Grade Scale.

In another embodiment a mechanism is provided for offering debt into a primary market a portion at a time in a "continuous" manner (i.e., periodically for any desired term at any desired periodic rate, such as hourly, daily, weekly, or monthly, for example), rather than issuing a given amount of debt into the primary market in one large issuance (wherein the debt terms such as yields, maturity dates, and maturity amounts are set for the entire amount of the debt by the date of the issuance).

While a number of embodiments of the present invention have been described, it is understood that these embodiments are illustrative only, and not restrictive, and that many modifications may become apparent to those of ordinary skill in the art. One of the "continuous" offerings of the CO Approach of the present invention may occur at a certain predetermined future time (so that potential buyers will know about the offering) and the predetermined time of such a future offering may be advertised in advance. Further still, the dynamically modified yield of the present invention may have an absolute minimum/maximum cap and/or may be an absolute value, and/or may be a spread which is above, below, or equal to a desired index. Further still, in addition to controlling and/or profiting from the setting of the bond's yield, one or more of the bond issuer, the underwriter, and a financial advisor (either alone or in combination) may control and/or profit from the selection of the index upon which the bond yield is based (when the yield is based on an index). Further still, the present invention may be applied to fixed rate and/or variable rate bonds which are tax-exempt and/or taxable and which are municipal, corporate, or agency bonds, for example. Further still, the present invention may be applied to debt offerings which are "natural" and/or "synthetic" (e.g., created using an interest rate swap). Further still, the debt may be unhedged, and/or imperfectly hedged, and/or perfectly hedged. Further still, while the present invention has been described principally with respect to a bond offering, it may, of course, be applied to any desired type of offering (e.g., any type of debt offering or any type of equity offering). Further still, the present invention may be applied in the context of any appropriate networking topography (either wired or wireless), such as the Internet, an intranet, a wide-area network, and a local-area network, for example.

What is claimed is:

1. A method implemented on a network accessible device for offering bonds, comprising:
issuing via a network accessible device at least a first bond, wherein the first bond has associated therewith a yield, and wherein the first bond is part of a predetermined amount of debt of an issuer;
offering via the network accessible device at least the first bond for sale into a primary market,
wherein each of the issuing of the first bond and the offering of the first bond occurs at essentially the same time,
wherein the yield associated with the first bond is set by the issuer and is based on a demand for the first bond;
issuing via the network accessible device at least a second bond, wherein the second bond has associated therewith a yield, and wherein the second bond is part of the predetermined amount of debt of the issuer;
offering via the network accessible device at least the second bond for sale into the primary market,
wherein each of the issuing of the second bond and the offering of the second bond occurs at essentially the same time, wherein the yield associated with the second bond is set by a demand based dynamic pricing engine initially set at the first yield and transitioned to a second yield associated with the second bond based on a value computed as: (a) the predetermined amount of debt minus (b) a value of the first bond which had been offered;
wherein the yield associated with at least one of the first and second issued bonds is published;
wherein the publication is carried out via a website;
wherein the website is accessible through at least one of the Internet, an intranet, a wide-area network, and a local-area network; and
generating via the network accessible device official reports of the issuing and the offering of the first and the second bond, wherein the official reports comprises at least a periodically generated term sheet containing a plurality of specific terms of the issuing and the offering of the first and the second bond.

2. The method of claim 1, wherein the yield associated with the first issued bond differs, from one offering to another, from a respective yield associated with the second issued bond.

3. The method of claim 1, wherein the yield associated with one of the first and second bonds is initially also determined based on at least one of: (a) a legal constraint imposed upon the issuer; (b) a debt service objective of the issuer; (c) a cash flow requirement of the issuer; and (d) a previous bond sales experience by the issuer.

4. The method of claim 1, wherein the yield of at least one of the first and second issued bonds is initially also determined based on a spread to a predetermined benchmark index.

5. The method of claim 1, wherein the yield of at least one of the first and second issued bonds is set as an absolute value.

6. The method of claim 1, wherein each of the issuing and the offering is periodic and occurs at one of: (a) a recurring frequency selected from the group including: a frequency greater than once per second; a frequency of once per second; a frequency between once per second and once per minute; a frequency of once per minute; a frequency between once per minute and once per hour; a frequency of once per hour; a frequency between once per hour and once per day; a frequency of once per day; a frequency between once per day and once per week; a frequency of once per week; a frequency between once per week and once per month; and a frequency of once per month; and (b) a non-recurring frequency.

7. The method of claim 1, wherein the demand based dynamic pricing engine transitions the yield associated with the second bond when a threshold of debt left to be offered is reached.

8. The method of claim 1, further comprising:
determining the yield associated with the second bond by the demand based dynamic pricing engine, wherein the yield associated with the second bond is initially set at the first yield and transitioned to the second yield associated with the second bond based on a value computed as: (a) the predetermined amount of debt minus (b) the value of the first bond which had been offered.

9. The method of claim 1, further comprising:
receiving at least one suspension instruction via a password-protected website interface; and
suspending offering of at least one of the first bond or the second bond based on the suspension instruction.

10. The method of claim 1, wherein the demand based dynamic pricing engine transitions the yield associated with the second bond based upon a flow of orders received and a targeted level of daily bond sales.

11. The method of claim 1, wherein the official reports further comprise at least a periodically generated statement containing audited financials and management discussion.

* * * * *

UNITED STATES PATENT AND TRADEMARK OFFICE
CERTIFICATE OF CORRECTION

PATENT NO. : 8,131,624 B1
APPLICATION NO. : 10/135306
DATED : March 6, 2012
INVENTOR(S) : Kevin Willens et al.

It is certified that error appears in the above-identified patent and that said Letters Patent is hereby corrected as shown below:

In the Specifications:

Column 5, line 28, delete "CUSIP) 6" and insert --CUSIP--

Signed and Sealed this
Third Day of September, 2013

Teresa Stanek Rea
*Acting Director of the United States Patent and Trademark Office*